(12) United States Patent
Mochizuki (10) Patent No.: US 6,568,853 B2
(45) Date of Patent: May 27, 2003

(54) GUIDE DEVICE FOR RELATIVE MOVEMENT BETWEEN RAM AND COLUMN FORMED OF SPLITTABLE MEMBERS

(75) Inventor: Masanori Mochizuki, Yao (JP)

(73) Assignee: Isel Co., Ltd., Yao (JP)

( * ) Notice: Subject to any disclaimer, the term of this patent is extended or adjusted under 35 U.S.C. 154(b) by 4 days.

(21) Appl. No.: 09/991,347

(22) Filed: Nov. 20, 2001

(65) Prior Publication Data

US 2002/0097926 A1 Jul. 25, 2002

(30) Foreign Application Priority Data

Jan. 22, 2001 (JP) .......................................... 2000-012708

(51) Int. Cl.$^7$ .............................................. F16C 29/04
(52) U.S. Cl. .......................................... 384/58; 384/52
(58) Field of Search .............................. 384/50, 52, 53, 384/58, 59

(56) References Cited

U.S. PATENT DOCUMENTS

| | | | |
|---|---|---|---|
| 2,903,307 A | * | 9/1959 | Peters et al. .................. 384/50 |
| 3,347,603 A | | 10/1967 | Ignatjev |
| 3,622,211 A | | 11/1971 | Mitton |
| 4,346,945 A | | 8/1982 | Tsuboi |
| 4,715,730 A | * | 12/1987 | Magnuson .................. 384/52 |
| 4,884,898 A | * | 12/1989 | Magnuson .................. 384/58 |

* cited by examiner

Primary Examiner—Thomas R. Hannon
(74) Attorney, Agent, or Firm—W. F. Fasse; W. G. Fasse (57) ABSTRACT

A guide device includes a shaft member and a column. The column has a through hole formed therein and the shaft member penetrates the through hole of the column. A plurality of pockets are formed on an inner circumferential surface of the through hole of the column. The pockets are disposed on a plurality of cross sectional planes that are perpendicular to an axial direction of the column. In each pocket, there are provided an outer race or roller rolling axially on an outer circumferential surface of the shaft member, and a supporting shaft supporting the outer race rotatably. The column is formed of a plurality of splittable members that are divided on cross sectional planes each perpendicular to the axial direction of the column and that pass through a center line of the supporting shaft. The adjacent splittable members are centered by the supporting shaft.

7 Claims, 8 Drawing Sheets

GUIDE DEVICE FOR RELATIVE MOVEMENT BETWEEN RAM AND COLUMN FORMED OF SPLITTABLE MEMBERS

BACKGROUND OF THE INVENTION

The present invention relates to a guide device, and more particularly, to a guide device or a linear bearing device for supporting an axially extending shaft member and a column slidable around the shaft member.

Figure 11:
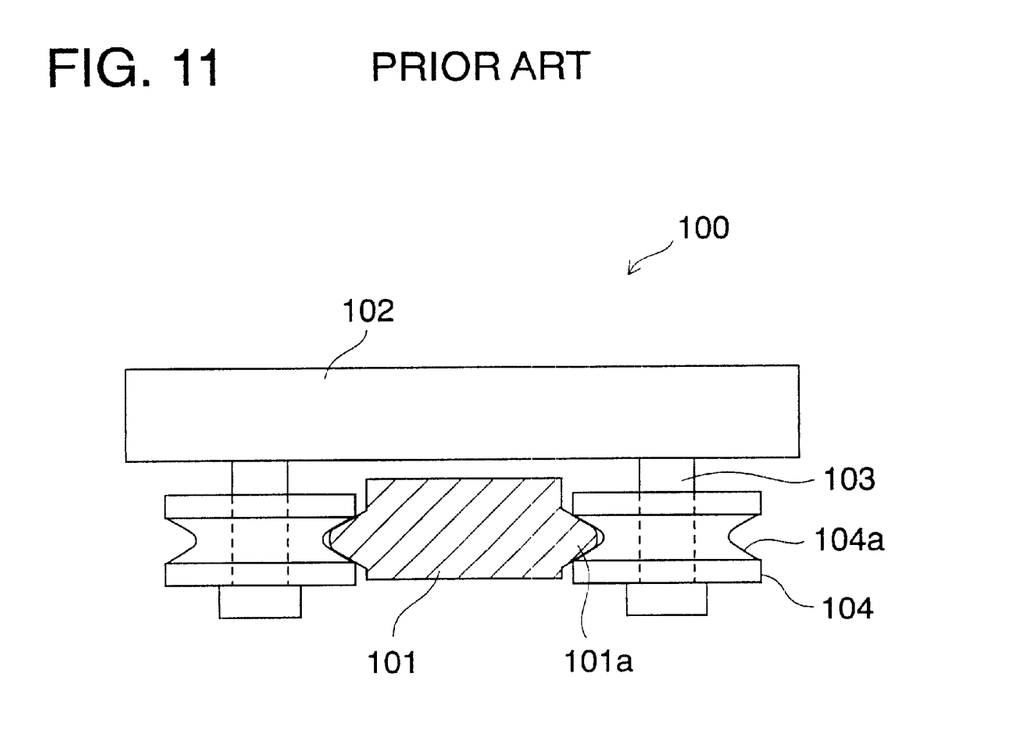
FIG. 11 illustrates a prior-art guide device or linear guide.

A linear guide is generally used for conveying products or articles in plants or factories. As shown in FIG. 11, a prior art linear guide 100 includes a linear rail 101 extending perpendicularly to the page, a slide base 102 provided over the rail 101, and a pair of tracking pulleys 104 each supported rotatably around a shaft 103 fitted to the bottom surface of the slide base 102. A linearly extending projection 101a of the rail 101 is engaged with a groove 104a formed around an outer circumferential surface of each tracking pulley 104.

In operation, when the slide base 102 slides along the extending direction of the rail 101, each tracking pulley 104 rotates around the shaft 103 and rolls along the projection 101a of the rail 101 with the groove 104a of the tracking pulley 104 engaged with the projection 101a of the rail 101.

Figure 12:
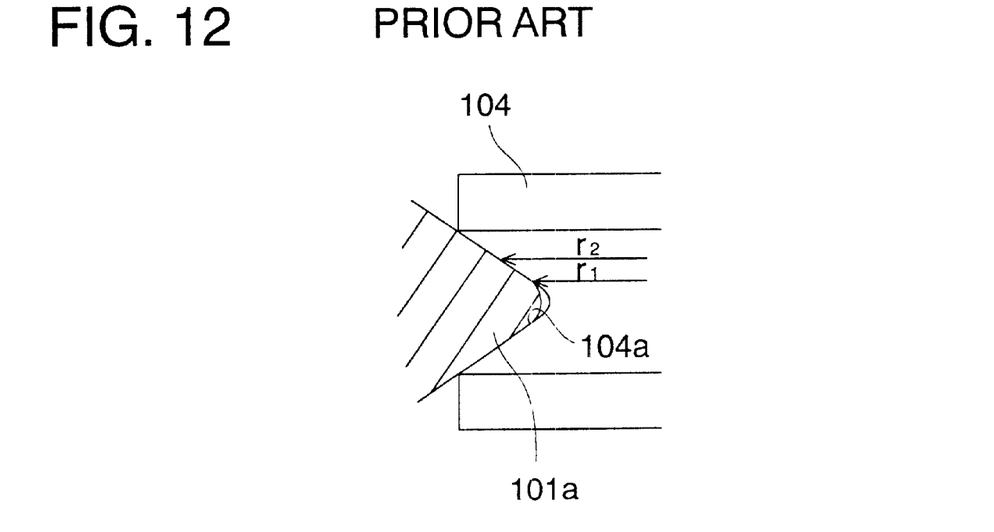
FIG. 12 is an enlarged view of a portion of FIG. 11.

In such a conventional linear guide, as shown in FIG. 12, a contact face between the groove 104a of the tracking pulley 104 and the projection 101a of the rail 101 is formed at positions where a distance from a center line of the tracking pulley 104, or a radius of the tracking pulley 104 is varied.

Thus, a circumferential speed of the tracking pulley 104 at a contact point having a radius of $r_1$ differs from that of the tracking pulley 104 at another contact point having a radius of $r_2$ ($>r_1$). Thus, when the tracking pulley 104 rolls along the projection 101a of the rail 101 and slides along the rail 101, a slippage will occur at positions where such a circumferential speed is different. As a result, the contact face between the groove 104a of the tracking pulley 104 and the projection 101a of the rail 101 will wear.

An object of the present invention is to prevent wear to the contact face of a guide device as well as to manufacture a slide base of a longer length as accurately as possible.

SUMMARY OF THE INVENTION

A guide device is provided to support a column or slide base having an axially extending shaft member thereinto to allow relative axial movement between the column and the shaft member. The column has an axially extending through hole or through groove. The shaft member penetrates the through hole or through groove of the column. A plurality of pockets are formed on an inner surface of the through hole or through groove of the column. The pockets are aligned on each of a plurality of cross sectional planes each perpendicular to the axial direction. In each pocket, there are provided a roller-shaped rolling element that rolls axially on an outer surface of the shaft member and a supporting shaft to support the rolling element rotatably. The column is formed of a plurality of splittable, disk-shaped members divided at the cross sectional planes that are perpendicular to the axial direction and that pass through the center line of the supporting shaft.

In this case, the rolling element that rolls axially on the outer surface of the shaft member has a roller shape or cylindrical shape, and the cylindrical surface forms a rolling surface. Therefore, a contact surface between the rolling element and the outer surface of the shaft member is formed at a position where a contact radius, or a distance from the center line of the rolling element is substantially constant. Thus, a differential slippage will not occur at a contact surface between the rolling element and the outer surface of the shaft member, thereby preventing wear to the contact surface between the rolling element and the outer surface of the shaft member.

Also, in this case, the whole column is formed of a plurality of splittable, disk-shaped members divided on the cross sectional planes each of which is perpendicular to the axial direction and passes the center line of the supporting shaft, thereby facilitating manufacture of a column of a longer length.

Generally, a column needs a boring or grooving process to form a through hole or through groove. However, when an integrated or one-piece column having a length of more than a certain length is bored or grooved, an actual boring or grooving process becomes difficult due to its length. Also, it increases a manufacturing cost to advance boring or grooving accuracy of such a column. On the other hand, according to the present invention, since a column is composed of a plurality of splittable, disk-shaped members stacked in the axial direction, boring or grooving each of the splittable members can be performed accurately by making each length of the splittable members a suitable length allowing for an accurate boring or grooving process. Also, combination of these splittable members suitably enables the whole column to extend as long as possible.

The shaft member may have a round outer circumferential surface and the rolling element may have a concavely curved cylindrical surface. Preferably, a radius of curvature "r" of the cylindrical surface of the rolling element satisfies an inequality, $0.52D \leq r \leq 0.58D$, where D is a diameter of the outer circumferential surface of the shaft member.

In this case, the abovementioned relation increases a contact area of the rolling element with the outer circumferential surface of the shaft member, thereby decreasing surface pressure of the rolling surface. Thus, wear resistance can be advanced and an allowable load can be increased. Furthermore, smooth rotation of the rolling element is secured and skewing of the rolling element is prevented.

Additionally, in the case that a radius of curvature "r" of a cylindrical surface of a rolling element is smaller than 0.52D, smooth rotation of the rolling element will be hindered and differential slippage will occur. On the other hand, in the case that a radius of curvature "r" of a cylindrical surface of a rolling element is greater than 0.58D, a contact area becomes smaller and an allowable load will decrease.

Alternatively, the shaft member may have a flat outer surface extending in the axial direction and the rolling element may have a convexly curved or linearly extending generating line of a cylindrical surface. Thus, a smooth rotation of the rolling element can be secured and skewing of the rolling element can be prevented. Especially, in the case of the linear cylindrical surface, working of the rolling element becomes easy.

Each adjacent splittable member of the column is centered through the supporting shaft. Thus, additional parts are not required to center each splittable member, thereby decreasing the number of components and simplifying the structure of the device.

Preferably, each supporting hole for the supporting shaft is a blind hole without penetrating each of the splittable members axially and circumferentially. Similarly, each pocket is a blind hole without penetrating each of the splittable members axially and circumferentially. Thus, rigidity of each splittable member can be advanced.

A tubular member may be provided at an inner surface of the through hole or the through groove of each splittable member of the column in order to sustain an excessive radial load occurred between the shaft member and the column.

BRIEF DESCRIPTION OF THE DRAWINGS

For a more complete understanding of the invention, reference should be made to the embodiments illustrated in greater detail in the accompanying drawings and described below by way of examples of the invention. In the drawings, which are not to scale.

DETAILED DESCRIPTION OF THE PREFERRED EMBODIMENTS

Figure 1:
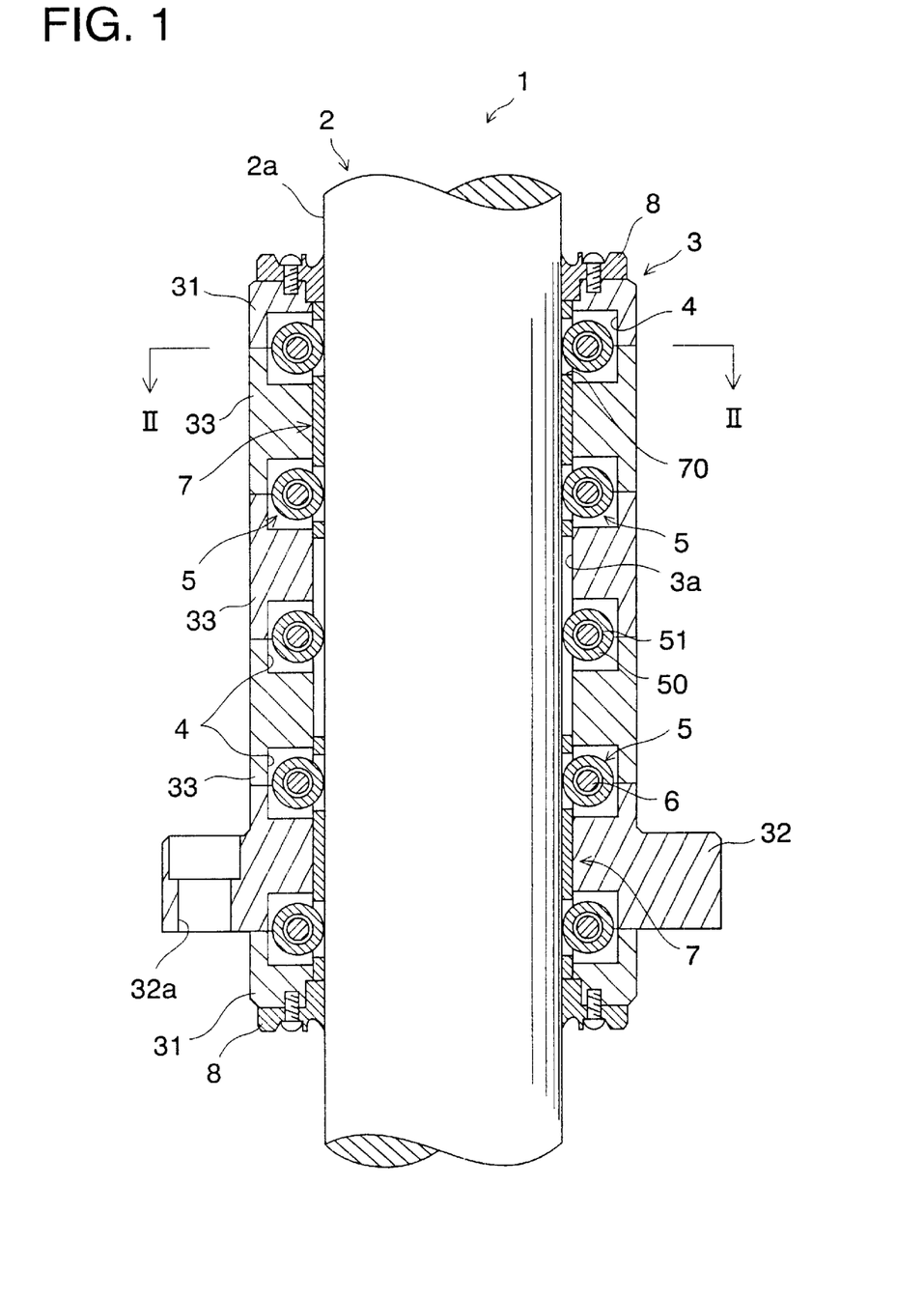
FIG. 1 is a front elevational view of a guide device according to one embodiment of the present invention, corresponding to a sectional view of FIG. 2 taken along line I—I.
Figure 2:
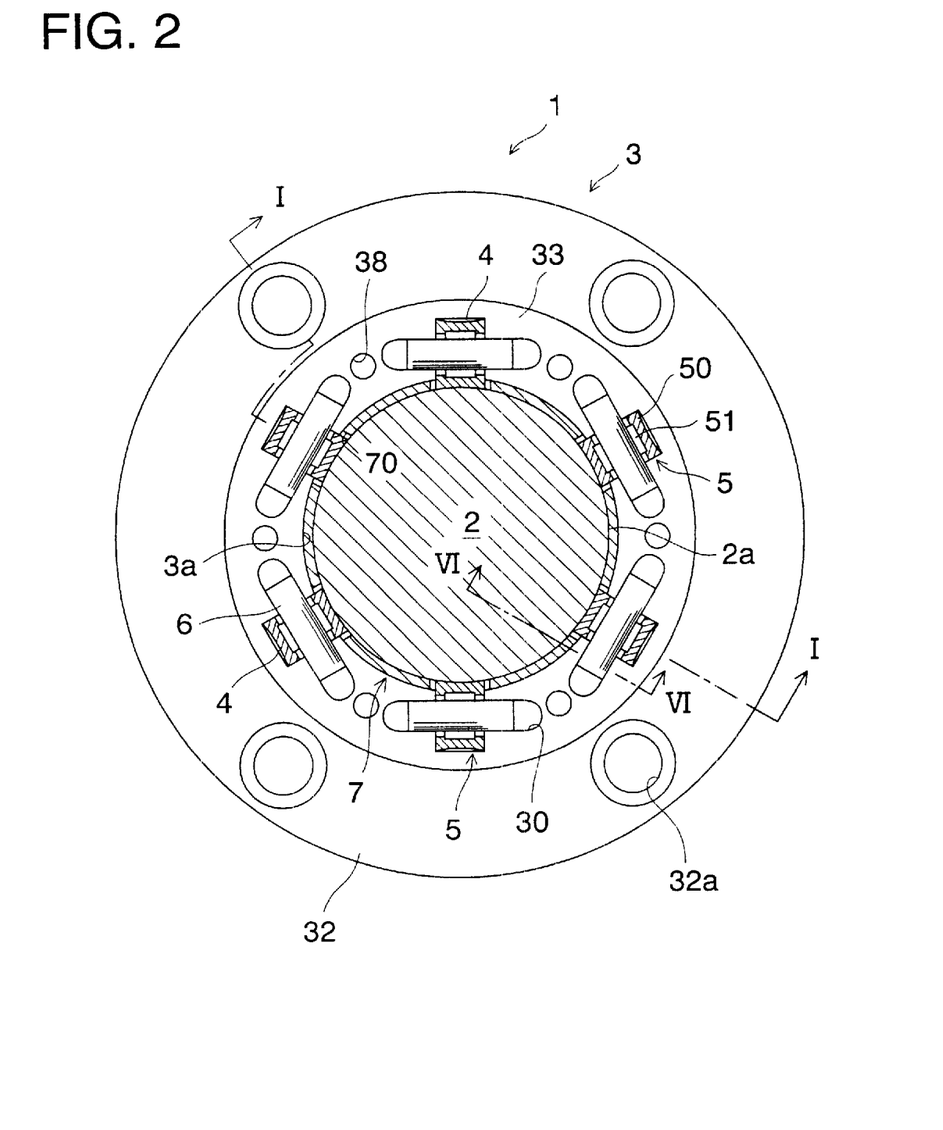
FIG. 2 is a sectional view of FIG. 1 taken along line II—II.

Referring now to the drawings, FIGS. 1 and 2 illustrate a preferred embodiment of the present invention. As shown in FIGS. 1 and 2, a guide device 1 includes a solid cylindrical shaft 2 extending axially, and a cylindrical column 3 provided around the shaft 2 and axially slidable relative to the shaft 2.

The shaft 2 has an outer circumferential surface 2a of a round cross sectional shape. The column 3 is disposed around the outer circumferential surface 2a of the shaft 2 and has an axially extending through hole 3a of a round cross sectional shape. A plurality of pockets 4 are provided in an inner circumferential surface of the through hole 3a. The pockets 4 are aligned with each other in a circumferential direction and a plurality of rows of these circumferentially aligned pockets 4 are provided in the axial direction. A needle bearing 5 is housed in each of the pockets 4 to slidably support the column 3 relative to the shaft 2 in an axial direction.

Here, six pockets 4 are disposed at sixty-degree intervals circumferentially, but three pockets may be provided at one-hundred-and-twenty degree intervals. Alternatively, four pockets may be provided at ninety-degree intervals. The number of pockets is suitably determined according to a diameter of the shaft, an allowable load of the guide device and the like.

Figure 3:
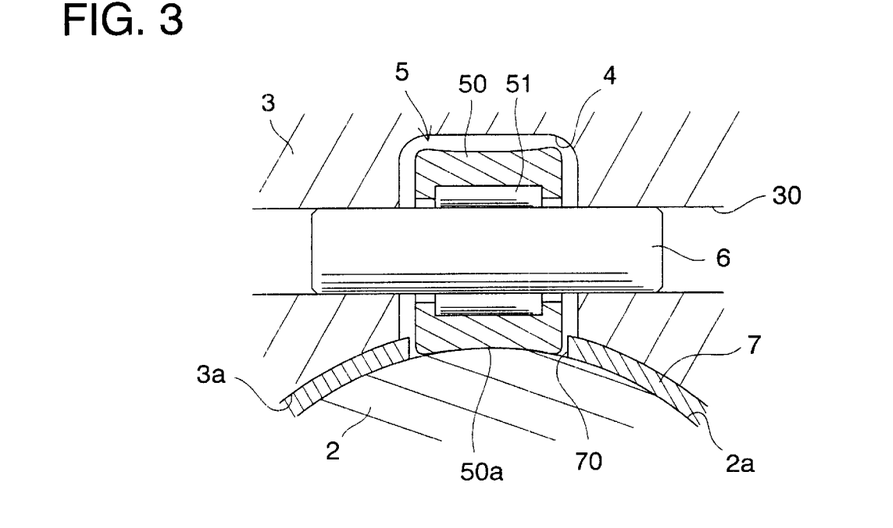
FIG. 3 is an enlarged view of a portion of FIG. 2.

The needle bearing 5, shown in FIG. 3, includes a roller-shaped or cylindrical outer race (or rolling element) 50 that rolls axially, or in a direction perpendicular to the page, on the outer circumferential surface 2a of the shaft 2, and a plurality of needle rollers 51 that are rotatably supported on an inner side of the outer race 50. A supporting shaft 6 is inserted into the needle bearing 5 and the outer race 50 is rotatably supported around the supporting shaft 6 through the needle rollers 51. Each supporting shaft 6 is fitted into a supporting hole 30 formed at each pocket 4 inside the column 3.

Figure 4:
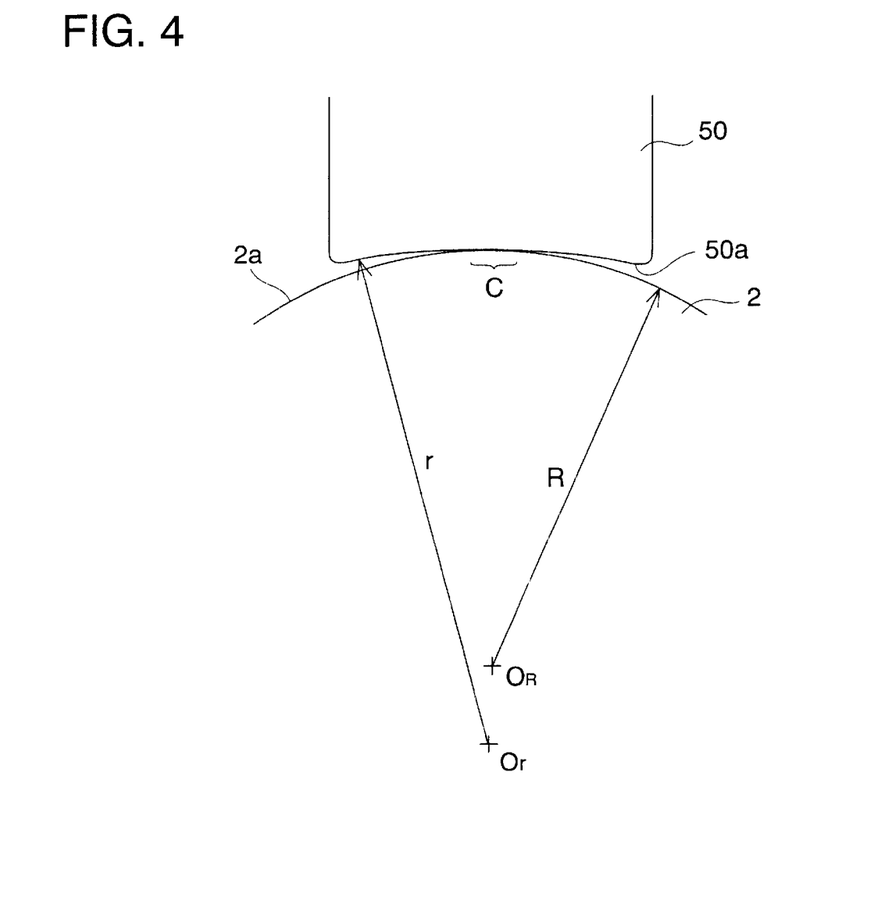
FIG. 4 is a further enlarged view of a portion of FIG. 3.

The outer race 50, shown in FIG. 4, preferably has a concavely curved cylindrical surface 50a. That is, a generating line of the cylindrical surface 50a is concavely curved. A radius of curvature of the cylindrical surface 50a of the outer race 50 is slightly greater than that of the outer circumferential surface 2a of the shaft 2. There exists an inequality, $0.52D \leq r \leq 0.58D$, wherein r is a radius of curvature of the cylindrical surface 50a of the outer race 50, and D is a diameter of the outer circumferential surface 2a of the shaft 2 contacting the cylindrical surface 50a. In FIG. 4, $O_r$ is a center of curvature of the cylindrical surface 50a, $O_R$ is a center of curvature of the outer circumferential surface 2a, and R is a radius of the outer circumferential surface 2a and is equal to D/2.

Thus, a contact area of the outer race 50 with the outer circumferential surface 2a of the shaft 2 increases. Thereby, a surface pressure of the rolling surface between the outer race 50 and the shaft 2 can be decreased, wear resistance can be improved, and an allowable load can be advanced. Furthermore, smooth rotation of the outer race 50 can be secured and skewing of the outer race 50 can be prevented. Also, in this case, a contact surface C between the cylindrical surface 50a of the outer race 50 and the outer circumferential surface 2a of the shaft 2 is formed at a central portion of the cylindrical surface 50a. Thus, a contact radius, or a distance from a center line of the outer race 50 to the contact surface C is substantially equal at every portion of the contact surface C. Thereby, a differential slip due to the rotation of the outer race 50 can be prevented from occurring at the contact surface C. As a result, wear to the contact surface C can be securely reduced.

In addition, in the case where a radius of curvature "r" of the cylindrical surface 50a is smaller than 0.52D, smooth rotation of the outer race 50 is hindered and differential slippage will tend to occur between the surfaces 2a and 50a. And in the case where a radius of curvature "r" is greater than 0.58D, a contact area becomes smaller and an allowable load will decrease.

The column 3, shown in FIG. 1, is composed of a plurality of disk-shaped, splittable members 31, 32 and 33 stacked in the axial direction. These splittable members 31, 32 and 33 are divided on cross sectional planes each of which crosses the center line of the supporting shaft 6 and is perpendicular to the axial direction. The splittable members are connected and fastened to each other by through bolts (not shown). Each splittable member has a plurality of axially extending through holes 38 to insert the through bolts thereinto, shown in FIG. 2.

Figure 5:
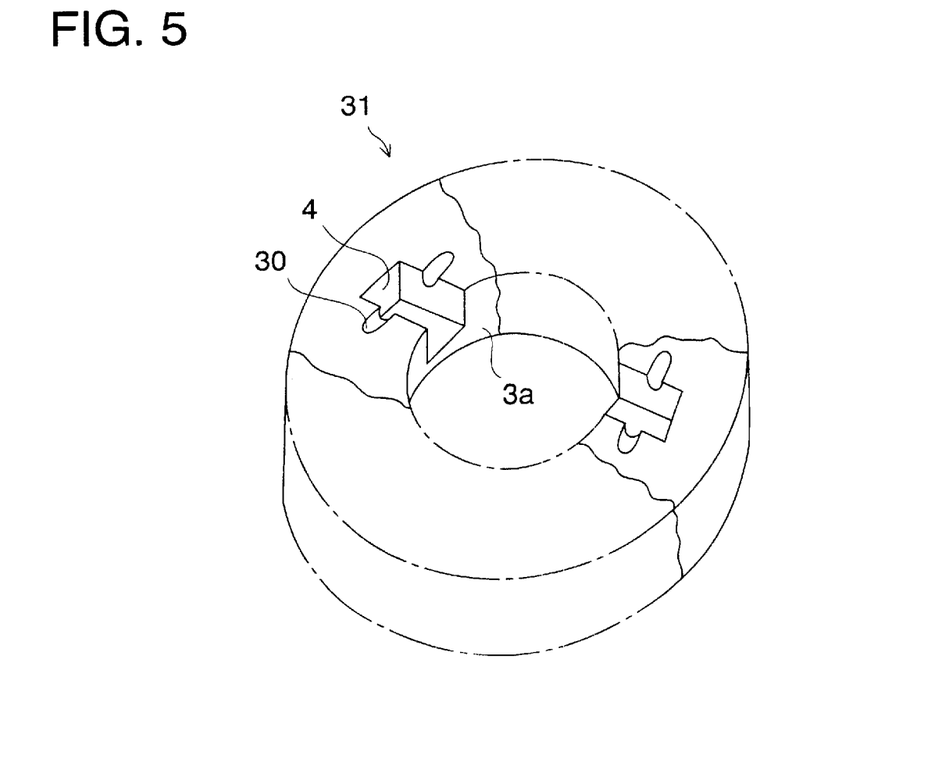
FIG. 5 is a perspective view of a splittable member of a column of the guide device.

Each of the pockets 4 and supporting holes 30 formed at each splittable member is a blind hole without penetrating each splittable member axially and circumferentially, shown in FIG. 5. Thus, rigidity of the splittable member is secured.

Figure 6:
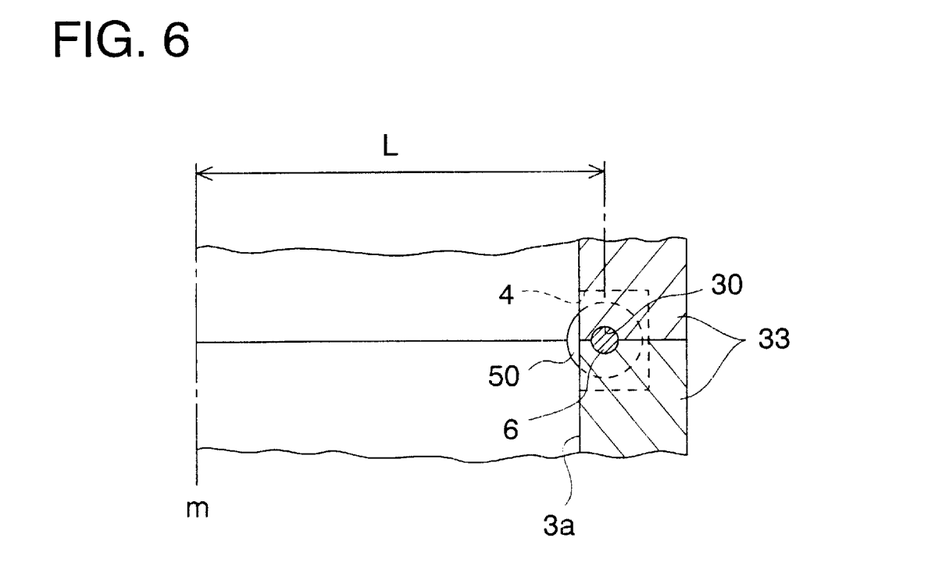
FIG. 6 is a sectional view of FIG. 2 taken along line VI—VI, showing only splittable members of a column.

Each of the adjacent splittable members, shown in FIG. 6, has a groove of a semicircular cross section formed at a position where a distance from an axial center line m is equal to L. Each adjacent groove forms a supporting hole 30. In this case, by inserting a supporting shaft 6 into each groove and making each adjacent splittable member contact with each other, the supporting shaft 6 functions as a knock pin and each adjacent splittable member is centered. In this case, additional parts are not required to center each splittable member, thereby reducing the number of components and simplifying the structure of the device.

Dust seals 8 are fitted to the splittable members 31 disposed at both opening portions of the through hole 3a of the column 3 to block dust from entering the through hole 3a. Also, the splittable member 32 has a flange portion formed thereon to fasten a base member (not shown) through a bolt inserted into a bolt hole 32a of the flange portion.

Figure 7:
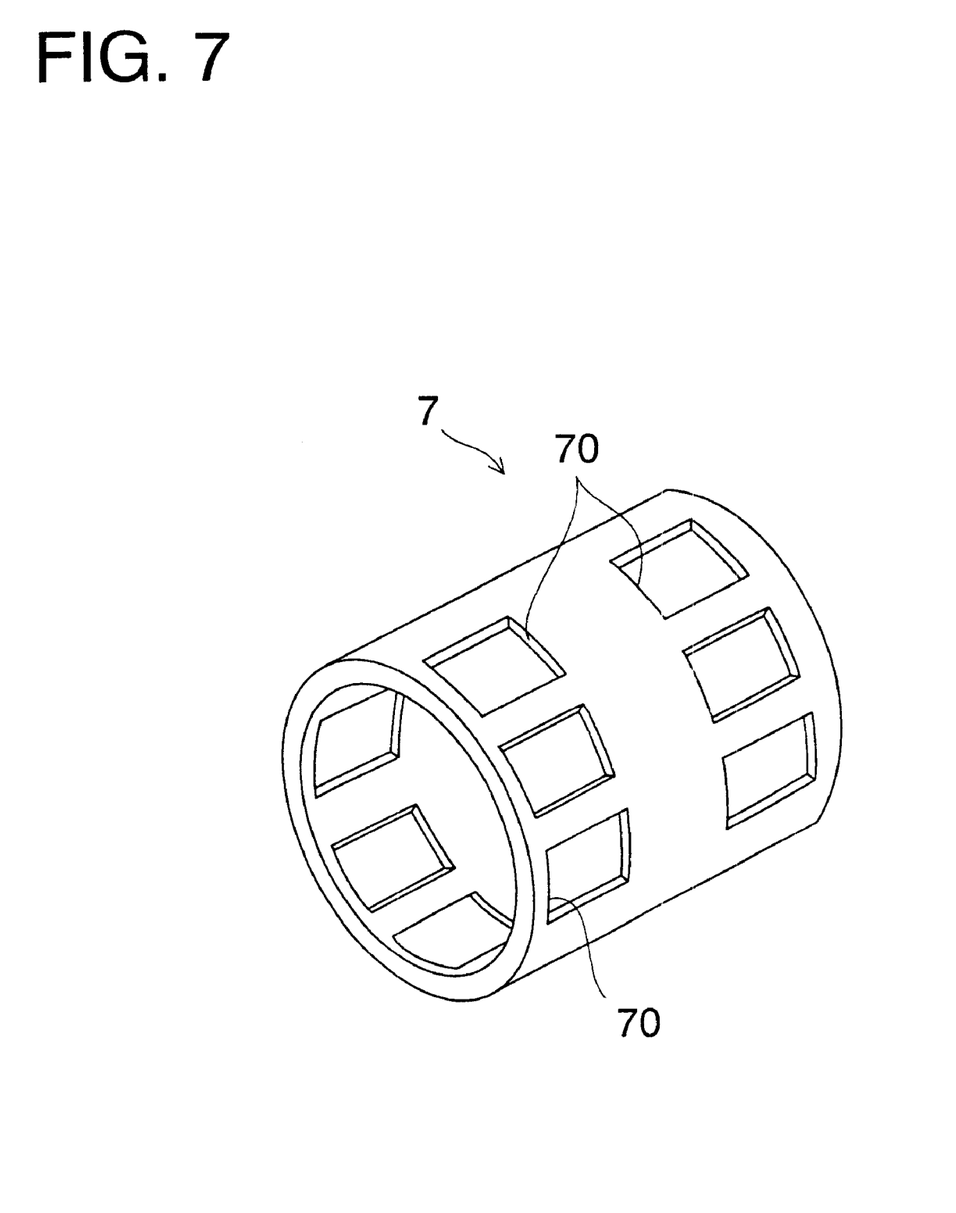
FIG. 7 is a perspective view of a thin-walled, cylindrical member used with the guide device.

Between the outer circumferential surface 2a of the shaft 2 and the inner circumferential surface of the through hole 3a of the column 3, a thin-walled, cylindrical member 7 is interposed. The cylindrical member 7 has a plurality of apertures 70 formed therein, shown in FIG. 7. Each aperture 70 corresponds to each pocket 4 of the column 3. The cylindrical member 7 is provided to support a radial load occurred between the shaft 2 and the column 3. When an excessive radial load causing a bending deformation of the shaft 6 is applied, such a radial load will be sustained by the cylindrical member 7. The cylindrical member 7 is preferably formed of bearing materials such as an oil retaining metal or plastics in the light of lubricity and wear resistance. Especially, a dry-type Teflon metal is more preferable due to the unnecessity of lubricants.

In operation of the guide device, when the column 3 moves axially along the shaft 2, each outer race 50 of the needle bearings 5 rotate around each supporting shaft 6 and rolls axially on the outer circumferential surface 2a of the shaft 2.

In this case, as abovementioned, since a differential slippage does not occur at the contact surface between the cylindrical surface 50a of the outer race 50 and the outer circumferential surface 2a of the shaft 2, wear to the contact surface can be prevented. Also, in this case, since the entire column 3 is composed of a plurality of disk-shaped, splittable members each having a relatively shorter length, a column of a relatively longer length can be easily manufactured by stacking a plurality of splittable members axially with boring accuracy of the entire through hole maintained.

Figure 8:
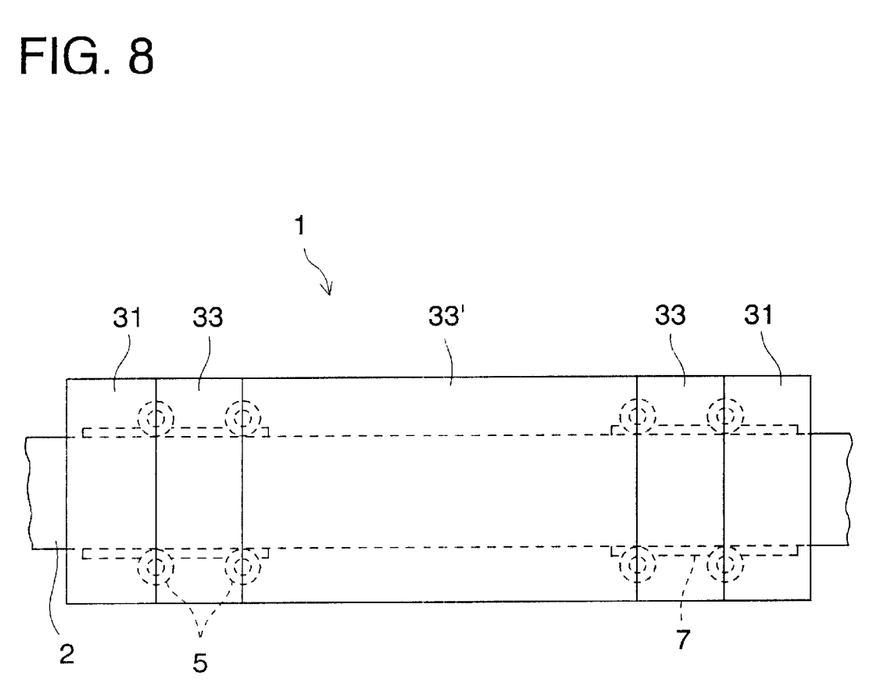
FIG. 8 is a side schematic view of a guide device, illustrating a variant of the present invention.

All the splittable members to be joined with each other need not to be short. As shown in FIG. 8, a splittable member 33' having a rather longer length may be used and joined to the adjacent members 33. The length of the splittable member 33' should be set at a length where highly accurate boring of one-piece member is possible. In such a way, a column having a longer length as a whole can be manufactured easily with boring accuracy of the entire through hole secured.

Figure 9:
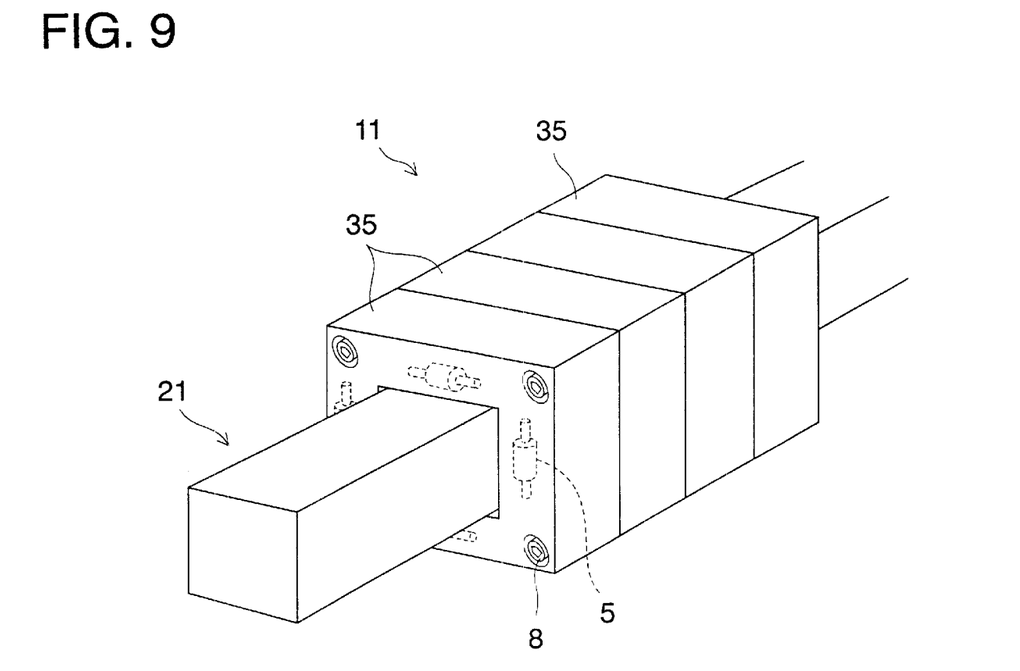
FIG. 9 is a perspective view of a guide device according to another embodiment of the present invention.

Next, FIG. 9 illustrates a guide device according to another embodiment of the present invention. This guide device 11 has a column formed of a plurality of splittable members 35 slidable along the shaft 21. The shaft 21 has a rectangular cross-sectional shape and the column has a through hole of a rectangular cross-sectional shape to receive the shaft 21. Each splittable member 35 is fastened to each other through a plurality of through bolts 8. Needle bearings 5 similar to those in the abovementioned embodiment are provided in each splittable member 35.

The outer race of each needle bearing 5 of the guide device 11 has a linearly extending cylindrical surface. That is, a generating line of the cylindrical surface of the outer race is straight, not curved. In this case, smooth rotation of the outer race is secured and skewing of the outer race can be prevented, and besides, working of the outer race can be facilitated.

Figure 10:
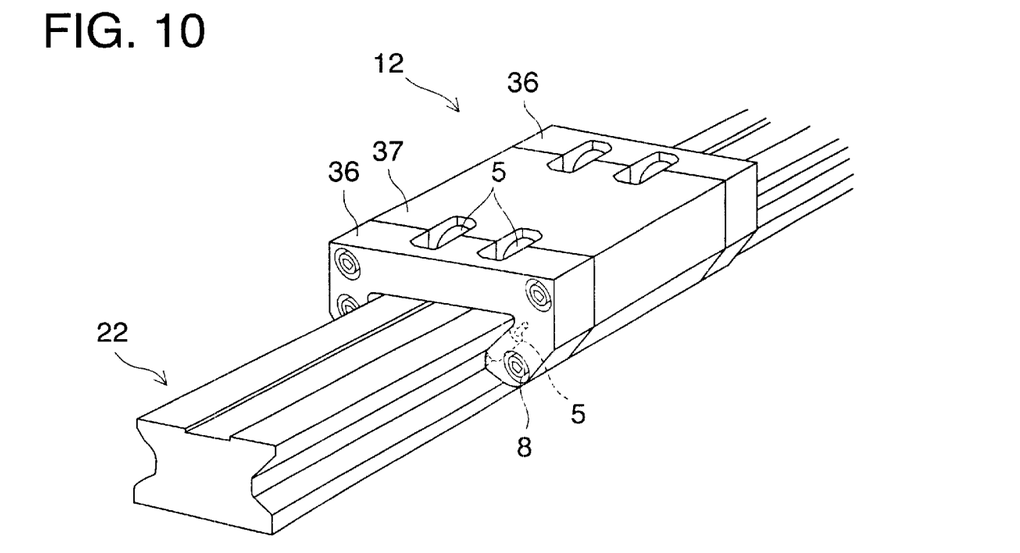
FIG. 10 is a perspective view of a guide device according to a still another embodiment of the present invention.

FIG. 10 shows a guide device according to a still another embodiment of the present invention. This guide device 12 has a column or a slide base formed of a plurality of splittable members 36 and 37 slidable along a rail 22. The rail 22 has a generally I-shaped cross section and the column has a through groove to receive the rail 22. Each splittable member is fastened to each other through a plurality of through bolts 8. Needle bearings 5 are provided in each splittable member.

The outer race of each needle bearing 5 of the guide device 12 has a convexly curved cylindrical surface. That is, a generating line of the cylindrical surface of the outer race is convexly curved. Thereby, smooth rotation of the outer race is secured and skewing of the outer race is prevented.

Those skilled in the art to which the invention pertains may make modifications and other embodiments employing the principles of this invention without departing from its spirit or essential characteristics particularly upon considering the foregoing teachings. The described embodiments and examples are to be considered in all respects only as illustrative and not restrictive. The scope of the invention is, therefore, indicated by the appended claims rather than by the foregoing description. Consequently, while the invention has been described with reference to particular embodiments and examples, modifications of structure, sequence, materials and the like would be apparent to those skilled in the art, yet fall within the scope of the invention.

What is claimed is:

1. A guide device for supporting a column having an axially extending shaft member inserted thereinto to allow relative axial movement between said column and said shaft member, said column having a through hole or a through groove extending in an axial direction, said through hole or through groove receiving said shaft member, a plurality of pockets being formed on an inner surface of said through hole or through groove of said column, said pockets being provided on a plurality of cross sectional planes each perpendicular to said axial direction, a roller-shaped rolling element being housed in each of said pockets, said rolling element rolling axially on an outer circumferential surface of said shaft member, a supporting shaft for rotatably supporting said rolling element being provided in each of said pockets, said column being formed of a plurality of disk-shaped, splittable members divided on said cross sectional planes each passing through a centerline of said supporting shaft.

2. The guide device according to claim 1, wherein said shaft member has an outer circumferential surface of a round cross section and said rolling element has a concavely curved cylindrical surface, a radius of curvature r of said cylindrical surface satisfying an inequality, $0.52D \leq r \leq 0.58D$, where D is a diameter of said outer circumferential surface of said shaft member.

3. The guide device according to claim 1, wherein said shaft member has a flat outer surface extending axially and said rolling element has a convexly curved cylindrical surface or a linear cylindrical surface.

4. The guide device according to claim 1, wherein each of said adjacent splittable members of said column is centered through said supporting shaft.

5. The guide device according to claim 1, wherein a supporting hole for receiving said supporting shaft is formed at said adjacent splittable members of said column, said supporting hole being a blind hole without penetrating each of said splittable members circumferentially.

6. The guide device according to claim 1, wherein each of said pockets is a blind hole without penetrating each of said splittable members axially.

7. The guide device of claim 1, wherein a thin-walled, tubular member is provided at said inner surface of said through hole or through groove of said column to support a radial load.

* * * * *

UNITED STATES PATENT AND TRADEMARK OFFICE
CERTIFICATE OF CORRECTION

PATENT NO. : 6,568,853 B2
DATED : May 27, 2003
INVENTOR(S) : Mochizuki

It is certified that error appears in the above-identified patent and that said Letters Patent is hereby corrected as shown below:

<u>Title page,</u>
Item [30], Foreign Application Priority Data, after "(JP)", replace "2000-012708" by -- 2001-012708 --.

Signed and Sealed this

Eighth Day of July, 2003

JAMES E. ROGAN
*Director of the United States Patent and Trademark Office*